United States Patent
Kim et al.

(10) Patent No.: US 11,495,866 B2
(45) Date of Patent: Nov. 8, 2022

(54) SEPARATOR AND ELECTROCHEMICAL DEVICE COMPRISING SAME

(71) Applicant: LG CHEM, LTD., Seoul (KR)

(72) Inventors: Chan-Jong Kim, Daejeon (KR); Su-Jin Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 255 days.

(21) Appl. No.: 16/763,400

(22) PCT Filed: Jul. 26, 2019

(86) PCT No.: PCT/KR2019/009365
§ 371 (c)(1),
(2) Date: May 12, 2020

(87) PCT Pub. No.: WO2020/022851
PCT Pub. Date: Jan. 30, 2020

(65) Prior Publication Data
US 2020/0321587 A1    Oct. 8, 2020

(30) Foreign Application Priority Data
Jul. 26, 2018  (KR) ........................ 10-2018-0087423

(51) Int. Cl.
*H01M 50/449* (2021.01)
*H01M 10/0525* (2010.01)
(Continued)

(52) U.S. Cl.
CPC ..... *H01M 50/449* (2021.01); *H01M 10/0525* (2013.01); *H01M 50/403* (2021.01); *H01M 50/411* (2021.01)

(58) Field of Classification Search
CPC . H01M 50/449; H01M 50/403; H01M 50/411
(Continued)

(56) References Cited

U.S. PATENT DOCUMENTS

2006/0046149 A1*  3/2006  Yong ................... H01M 50/403
428/407
2008/0292968 A1* 11/2008  Lee .................... H01M 10/0565
429/247
(Continued)

FOREIGN PATENT DOCUMENTS

CN   104508861 A    4/2015
CN   108172741 A  *  6/2018  .......... H01M 10/052
(Continued)

OTHER PUBLICATIONS

European Patent Office Search Report dated Mar. 31, 2021 for corresponding EP Application No. 19841939.2.
(Continued)

*Primary Examiner* — Sean P Cullen
(74) *Attorney, Agent, or Firm* — Birch, Stewart, Kolasch & Birch, LLP (57) ABSTRACT

A separator is provided which includes: a separator base including a porous polymer substrate having a plurality of pores, and a porous coating layer positioned on at least one surface of the porous polymer substrate and containing a plurality of inorganic particles and a binder polymer positioned on the whole or a part of the surface of the inorganic particles to connect the inorganic particles with one another and fix them; and a porous adhesive layer positioned on at least one surface of the separator base and including polyvinylidene fluoride-co-hexafluoropropylene containing vinylidene fluoride-derived repeating units and hexafluoropropylene-derived repeating units, wherein the ratio of the number of the hexafluoropropylene (HFP)-derived repeating units (HFP substitution ratio) based on the total number of the vinylidene fluoride-derived repeating units and the hexafluoropropylene-derived repeating units is 4.5% to 9%. An electrochemical device including the separator is also provided.

12 Claims, 5 Drawing Sheets

(51) Int. Cl.
*H01M 50/403* (2021.01)
*H01M 50/411* (2021.01)

(58) Field of Classification Search
USPC .......................... 429/145, 251, 254
See application file for complete search history.

(56) References Cited

U.S. PATENT DOCUMENTS

| | | | |
|---|---|---|---|
| 2009/0111025 A1* | 4/2009 | Lee | H01M 50/449 429/251 |
| 2013/0244082 A1* | 9/2013 | Lee | H01M 4/485 429/144 |
| 2013/0316219 A1* | 11/2013 | Ha | H01M 50/449 427/596 |
| 2014/0287294 A1* | 9/2014 | Lee | H01M 10/0568 427/562 |
| 2015/0180002 A1 | 6/2015 | Nishikawa et al. | |
| 2015/0200388 A1 | 7/2015 | Yoshitomi | |
| 2015/0303003 A1 | 10/2015 | Ha et al. | |
| 2017/0179456 A1 | 6/2017 | Kim et al. | |
| 2017/0338460 A1 | 11/2017 | Kim et al. | |
| 2018/0034025 A1 | 2/2018 | Lee et al. | |
| 2018/0301762 A1 | 10/2018 | Kwon et al. | |
| 2019/0131604 A1 | 5/2019 | Yoon et al. | |
| 2020/0266407 A1* | 8/2020 | Honda | H01M 50/44 |
| 2020/0321583 A1* | 10/2020 | Hu | H01M 50/457 |

FOREIGN PATENT DOCUMENTS

| | | | | |
|---|---|---|---|---|
| JP | 2012-221741 | A | 11/2012 | |
| JP | 5643465 | B2 | 12/2014 | |
| KR | 10-2003-0094696 | A | 12/2003 | |
| KR | 10-2014-0050877 | A | 4/2014 | |
| KR | 10-2015-0050060 | A | 5/2015 | |
| KR | 10-2016-0129762 | A | 11/2016 | |
| KR | 10-2017-0074535 | A | 6/2017 | |
| KR | 10-2017-0093755 | A | 8/2017 | |
| KR | 10-2018-0018408 | A | 2/2018 | |
| WO | WO-2006045630 | A2 * | 5/2006 | C08L 27/16 |
| WO | WO 2017/082259 | A1 | 5/2017 | |
| WO | WO-2017082258 | A1 * | 5/2017 | H01M 10/052 |

OTHER PUBLICATIONS

International Search Report issued in PCT/KR2019/009365 (PCT/ISA/210), dated Nov. 28, 2019.

* cited by examiner

SEPARATOR AND ELECTROCHEMICAL DEVICE COMPRISING SAME

TECHNICAL FIELD

The present disclosure relates to a separator and an electrochemical device including the same. More particularly, the present disclosure relates to a separator having improved adhesion with an electrode and air permeability and showing an excellent effect of reducing resistance, and an electrochemical device including the same.

The present application claims priority to Korean Patent Application No. 10-2018-0087423 filed on Jul. 26, 2018 in the Republic of Korea, the disclosures of which including the specification and drawings are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte. However, such lithium ion batteries show a safety problem related with ignition and explosion caused by the use of an organic electrolyte, and have a difficulty in manufacture thereof.

More recently, lithium ion polymer batteries have improved the above-mentioned disadvantage of lithium ion batteries and spotlighted as one of the next-generation batteries. However, such lithium ion polymer batteries still have relatively lower capacity as compared to lithium ion batteries, and particularly show insufficient discharge capacity at low temperature. Thus, there is an imminent need for improving this.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problem of an electrochemical device, there has been suggested a separator including a porous organic/inorganic coating layer formed by coating a mixture of an excessive amount of inorganic particles with a binder polymer to at least one surface of a porous polymer substrate having a plurality of pores.

However, such a separator having a porous organic/inorganic coating layer causes the problems of degradation of air permeability, increase in resistance and degradation of adhesion between electrodes. Under these circumstances, there is a need for solving the problems.

DISCLOSURE

Technical Problem

The present disclosure is designed to solve the problems of the related art, and therefore the present disclosure is directed to providing a separator which has improved adhesion with an electrode and air permeability, shows an excellent effect of reducing resistance and includes a porous adhesive layer having a uniform porous structure.

The present disclosure is also directed to providing an electrochemical device including the separator.

Technical Solution

In one aspect of the present disclosure, there is provided a separator according to any one of the following embodiments.

According to the first embodiment of the present disclosure, there is provided a separator which includes:

a separator base including a porous polymer substrate having a plurality of pores, and a porous coating layer on at least one surface of the porous polymer substrate, wherein the porous coating layer comprises a plurality of inorganic particles and a binder polymer positioned on the whole or a part of the surface of the inorganic particles to connect and fix the inorganic particles with one another; and a porous adhesive layer on at least one surface of the separator base, wherein the porous adhesive layer comprises polyvinylidene fluoride-co-hexafluoropropylene containing vinylidene fluoride-derived repeating units and hexafluoropropylene-derived repeating units, wherein the ratio of the number of the hexafluoropropylene (HFP)-derived repeating units (HFP substitution ratio) based on the total number of the vinylidene fluoride-derived repeating units and the hexafluoropropylene-derived repeating units is 4.5% to 9%.

According to the second embodiment of the present disclosure, there is provided the separator as defined in the first embodiment, wherein the ratio of the number of the hexafluoropropylene (HFP)-derived repeating units (HFP substitution ratio) based on the total number of the vinylidene fluoride-derived repeating units and the hexafluoropropylene-derived repeating units is 5% to 8%.

According to the third embodiment of the present disclosure, there is provided the separator as defined in the first or the second embodiment, wherein the porous adhesive layer includes pores wherein a difference between the maximum pore diameter and average pore diameter ranges from 0.2 μm to 0.6 μm.

According to the fourth embodiment of the present disclosure, there is provided the separator as defined in any one of the first to the third embodiments, wherein the porous polymer substrate is a polyolefin-based porous polymer substrate.

According to the fifth embodiment of the present disclosure, there is provided the separator as defined in any one of the first to the fourth embodiments, wherein the porous adhesive layer has a porosity of 30% to 70%.

According to the sixth embodiment of the present disclosure, there is provided the separator as defined in at least one of the first to the fifth embodiments, wherein the binder polymer is any one selected from the group consisting of polyvinylidene fluoride-co-hexafluoropropylene, polyvinylidene fluoride-co-trichloroethylene, polymethyl methacrylate, polybutyl acrylate, polybutyl methacrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose.

According to the seventh embodiment of the present disclosure, there is provided the separator as defined in any one of the first to the sixth embodiments, wherein the inorganic particles are at least one selected from the group consisting of inorganic particles having a dielectric constant of 5 or more, and inorganic particles having lithium ion transportability.

According to the eighth embodiment of the present disclosure, there is provided the separator as defined in any one of the first to the seventh embodiments, wherein the porous adhesive layer has a porous structure formed by phase separation caused by a difference between the evaporation rate of a solvent and a non-solvent when applying a coating composition including polyvinylidene fluoride-co-hexafluoropropylene, the solvent and the non-solvent onto at least one surface of the separator base, followed by drying the porous adhesive layer.

According to the ninth embodiment of the present disclosure, there is provided a method for manufacturing a separator, comprising:

preparing a separator base comprising a porous polymer substrate having a plurality of pores, and a porous coating layer positioned on at least one surface of the porous polymer substrate and containing a plurality of inorganic particles and a binder polymer positioned on the whole or a part of the surface of the inorganic particles to connect the inorganic particles with one another and fix them;

applying a coating composition including polyvinylidene fluoride-co-hexafluoropropylene containing vinylidene fluoride-derived repeating units and hexafluoropropylene-derived repeating units, a solvent and a non-solvent onto at least one surface of the separator base; and drying the coating composition to form a porous adhesive layer having a porous structure formed by phase separation caused by a difference between the evaporation rate of the solvent and the non-solvent, wherein the ratio of the number of the hexafluoropropylene-derived repeating units based on the total number of the vinylidene fluoride-derived repeating units and the hexafluoropropylene-derived repeating units is 4.5% to 9%.

According to the tenth embodiment, there is provided the method for manufacturing a separator as defined in the ninth embodiment, wherein the ratio of the number of the hexafluoropropylene (HFP)-derived repeating units (HFP substitution ratio) based on the total number of the vinylidene fluoride-derived repeating units and the hexafluoropropylene-derived repeating units is 5% to 8%.

According to the eleventh embodiment, there is provided the method for manufacturing a separator as defined in the ninth or tenth embodiment, wherein the solvent is at least one compound selected from acetone, tetrahydrofuran, methylene chloride, chloroform, dimethyl formamide, N-methyl-2-pyrrolidone, methyl ethyl ketone and cyclohexane, and wherein the non-solvent is at least one compound selected from the group consisting of methanol, ethanol, isopropanol, propanol and water.

According to the twelfth embodiment, there is provided the method for manufacturing a separator as defined in any one of the ninth to the eleventh embodiments, wherein the coating composition includes the non-solvent at a weight ratio of 1% to 50% based on the total weight of the solvent and the non-solvent.

According to the thirteenth embodiment, there is provided the method for manufacturing a separator as defined in any one of the ninth to the twelfth embodiments, wherein the coating composition includes polyvinylidene fluoride-co-hexafluoropropylene in an amount of 2 parts to 10 parts by weight based on 100 parts by weight of the total weight of the solvent and the non-solvent.

According to the fourteenth embodiment, there is provided the method for manufacturing a separator as defined in any one of the ninth to the thirteenth embodiments, wherein the solvent and the non-solvent in the coating composition have a difference in boiling point of 10° C. or more.

According to the fifteenth embodiment of the present disclosure, there is provided an electrochemical device including a cathode, an anode and a separator interposed between the cathode and the anode, wherein the separator is the separator as defined in any one of the first to the eighth embodiments.

According to the sixteenth embodiment of the present disclosure, there is provided the electrochemical device as defined in the fifteenth embodiment, which is a lithium secondary battery.

Advantageous Effects

According to an embodiment of the present disclosure, a porous coating layer including inorganic particles and a binder polymer, and a porous adhesive layer are coated sequentially, thereby allowing thin film coating while retaining excellent adhesion with an electrode. In addition, the porous adhesive layer formed by a dry phase separation process has an improved porous structure, thereby improving air permeability, reducing the problem of the separator resistance and ensuring coating uniformity.

Particularly, in the separator according to an embodiment of the present disclosure, the porous adhesive layer has coating uniformity, and thus the porous structure formed over the whole porous adhesive layer is uniform. Therefore, it is possible to control the standard deviation in air permeability and resistance of the separator and the standard deviation in pore size of the porous adhesive layer to a significantly low level. As a result, it is possible to prevent the problem of dendrite formation caused by interruption, such as a delayed rate at a specific portion, in transporting lithium ions through the separator. In addition, the secondary battery using the separator can realize excellent life characteristics.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a separator which includes: a separator base including a porous polymer substrate having a plurality of pores, and a porous coating layer positioned on at least one surface of the porous polymer substrate and containing a plurality of inorganic particles and a binder polymer positioned on the whole or a part of the surface of the inorganic particles to connect the inorganic particles with one another and fix them; and a porous adhesive layer positioned on at least one surface of the separator base and including an adhesive resin which realizes adhesive property through heating at a temperature lower than the melting point of the porous polymer substrate, wherein the porous adhesive layer has a porous structure formed by phase separation caused by a difference between the evaporation rate of a solvent and that of a non-solvent, when applying a coating composition including an adhesive resin, the solvent and the non-solvent onto at least one surface of the separator base, followed by drying.

According to the related art, slurry for forming a porous organic/inorganic coating layer including inorganic particles in combination with a binder polymer is applied on a porous polymer substrate, and then a binder polymer-enriched structure is formed on the surface through vapor-induced phase separation, thereby providing adhesive property to an electrode.

In other words, 'vapor-induced phase separation' is a process which includes preparing slurry for forming a porous organic/inorganic coating layer using a solvent of the binder polymer alone, and drying the porous polymer substrate coated with the slurry while it is exposed to environment enriched with water as a non-solvent of the binder polymer, so that the binder polymer may be gelled on the coating layer surface that is in direct contact with the water atmosphere as a non-solvent, and a layered structure in which the binder polymer is relatively enriched may be formed.

However, when a binder polymer-enriched surface layer is formed through the vapor-induced phase separation process and is applied as an electrode adhesive layer, the electrode adhesive layer may function as resistance when it has an excessively large thickness, and may not realize adhesive property sufficiently when it has an excessively small thickness. Particularly, in the case of vapor-induced phase separation, there is a disadvantage in that the thickness of the layered structure formed as an electrode adhesive layer cannot be controlled with ease.

In addition, since such vapor-induced phase separation proceeds on the surface of the slurry for forming a porous organic/inorganic coating layer, the coating layer shows significantly low surface uniformity and the binder is distributed in such a manner that a polymer-enriched structure may be formed from the surface layer toward the interfacial layer, thereby causing an increase in resistance of the coated separator.

On the contrary, the porous adhesive layer in the separator according to an embodiment of the present disclosure has a porous structure formed by phase separation caused by a difference between the evaporation rate of a solvent and that of a non-solvent, when applying a coating composition including an adhesive resin, the solvent and the non-solvent onto at least one surface of the separator base, followed by drying.

As used herein, 'solvent' means one capable of dissolving 5 wt % or more of the adhesive resin even at a low temperature less than 60° C., while 'non-solvent' means one that allows neither dissolution nor swelling of the adhesive resin up to the melting point of the adhesive resin or the boiling point of liquid.

Herein, the non-solvent has a higher boiling point and lower evaporation rate as compared to the solvent, and corresponds to a solvent that allows neither dissolution nor swelling of the adhesive resin forming the porous adhesive layer.

According to an embodiment of the present disclosure, when the porous coating layers are formed on both surfaces of the porous polymer substrate, the porous adhesive layer may be formed on the top of each porous coating layer. In addition, when the porous coating layer is formed merely on one surface of the porous polymer substrate, the porous adhesive layer may be formed directly on the top of the porous coating layer and the other surface of the porous polymer substrate having no porous coating layer.

Particularly, the porous polymer substrate may be a porous polymer film substrate or porous polymer non-woven web substrate.

The porous polymer film substrate may include a porous polymer film including a polyolefin, such as polyethylene or polypropylene. For example, such a polyolefin porous polymer film substrate realizes a shut-down function at a temperature of 80-130° C.

Herein, the polyolefin porous polymer film may include a polymer formed of polyethylene, such as high-density polyethylene, linear low-density polyethylene, low-density polyethylene and ultrahigh-molecular weight polyethylene, polypropylene, polybutylene and polypentene alone or in combination.

In addition, the porous polymer film substrate may be prepared by using various polymers, such as polyesters, in addition to polyolefins and forming the polymers into a film shape. The porous polymer film substrate may be formed to have a stacked structure of two or more film layers, wherein each film layer may include the above-mentioned polymers, such as polyolefins and polyesters, alone or in combination.

In addition to the above-mentioned polyolefins, the porous polymer film substrate and the porous non-woven web substrate may include polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylenenaphthalene, or the like, alone or in combination.

Although there is no particular limitation in thickness of the porous polymer substrate, the porous polymer substrate may have a thickness of 1-100 µm, particularly 5-50 µm. Although the pore size and porosity of the pores present in the porous polymer substrate are not also limited particularly, it is preferred that the pore size and porosity are 0.01-50 µm and 10-95%, respectively.

According to an embodiment of the present disclosure, the binder polymer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with each other, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloroethylene, polymethyl methacrylate, polybutyl acrylate, polybutylmethacrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, carboxymethyl cellulose, or the like.

The weight ratio of the inorganic particles to the binder polymer may be 50:50-99:1, particularly 70:30-95:5. When the weight ratio of the inorganic particles to the binder polymer satisfies the above-defined range, it is possible to prevent the problem of a decrease in pore size and porosity of the resultant porous coating layer, caused by an increase in content of the binder polymer, and to solve the problem of degradation of peeling resistance of the resultant coating layer, caused by a decrease in content of the binder polymer.

The porous coating layer in the separator according to an embodiment of the present disclosure may further include other additives in addition to the inorganic particles and binder polymer.

According to the present disclosure, non-limiting examples of the inorganic particles may include high-dielectric constant inorganic particles having a dielectric constant of 5 or more, particularly 10 or more, inorganic particles having lithium ion transportability, or a mixture thereof.

Non-limiting examples of the inorganic particles having a dielectric constant of 5 or more may include $BaTiO_3$, $Pb(Zr,Ti)O_3$ (PZT), $Pb_{1-x}La_xZr_{1-y}Ti_yO_3$ (PLZT, wherein $0<x<1$, $0<y<1$), $Pb(Mg_{1/3}Nb_{2/3})O_3PbTiO_3$(PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$, AlO(OH) and $Al_2O_3 \cdot H_2O$ or a mixture thereof.

As used herein, 'inorganic particles having lithium ion transportability' refers to inorganic particles which contain lithium elements and do not store lithium but transport lithium ions. Non-limiting examples of the inorganic particles having lithium ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, and $P_2S_5$-based glass ($Li_xP_yS_z$, $0<x<3$, $0<y<3$, $0<z<7$), such as LiI—$Li_2S$—$P_2S_5$, or a mixture thereof.

There is no particular limitation in the thickness of the porous coating layer, but the porous coating layer may have a thickness of 1-10 µm, more particularly 1.5-6 µm. In addition, the porosity of the porous coating layer is not particularly limited, but may be 35-65% preferably.

According to an embodiment of the present disclosure, the porous coating layer may be an organic coating layer using organic slurry or an aqueous coating layer using aqueous slurry. Particularly, an aqueous coating layer is favorable to thin film coating and to a decrease in resistance of a separator.

The adhesive resin is polyvinylidene fluoride-co-hexafluoropropylene containing vinylidene fluoride-derived repeating units and hexafluoropropylene-derived repeating units.

The ratio of the number of the hexafluoropropylene (HFP)-derived repeating units based on the total number of the vinylidene fluoride-derived repeating units and the hexafluoropropylene-derived repeating units, i.e. HFP substitution ratio, is 4.5-9%, particularly 5-8%, or 5-7%, 5-6%, 6-7%, or 7-8%. When the HFP substitution ratio satisfies the above-defined range, the copolymer may retain suitable solubility to a solvent (acetone) and may have increased affinity with a non-solvent. In addition, it is possible to prevent the problem of formation of relatively large and non-uniform pores caused by the binding of non-solvent and evaporation thereof for the purpose of reducing interfacial energy when the copolymer has low affinity with a non-solvent.

The porous adhesive layer includes pores showing a difference between the maximum pore diameter and average pore diameter of 0.2-0.6 µm, particularly 0.2-0.5 µm, and more particularly 0.2-0.4 µm. When the difference between the maximum pore diameter and average pore diameter satisfies the above-defined range, it is possible to improve the uniformity of the pores in the porous coating layer, and thus to transport lithium ions efficiently.

According to an embodiment of the present disclosure, the porous adhesive layer may have a porosity of 30-70%, particularly 35-65%, and more particularly 40-60%. When the porosity of the porous adhesive layer satisfies the above-defined range, it is possible to ensure adhesive property with another substrate (electrode, etc.) by virtue of adequate coating layer density and to realize ion channels of the porous coating layer.

In another aspect of the present disclosure, there is provided a method for manufacturing a separator, comprising:

preparing a separator base which includes a porous coating layer including a plurality of inorganic particles and a binder polymer on at least one surface of a porous polymer substrate having a plurality of pores;

applying a coating composition including polyvinylidene fluoride-co-hexafluoropropylene containing vinylidene fluoride-derived repeating units and hexafluoropropylene-derived repeating units, a solvent and a non-solvent onto at least one surface of the separator base; and drying the coating composition to form a porous adhesive layer having a porous structure formed by phase separation caused by a difference between the evaporation rate of the solvent and that of the non-solvent, wherein the ratio of the number of the hexafluoropropylene fluoride-derived repeating units based on the total number of the vinylidene-derived repeating units and the hexafluoropropylene-derived repeating units is 4.5-9%.

First, to form a porous coating layer, a binder polymer is dissolved in a solvent and inorganic particles are added thereto and dispersed therein to prepare a composition for forming a porous coating layer. The inorganic particles may be added after they are pulverized to a predetermined average particle diameter. In a variant, the inorganic particles may be added to the binder polymer solution and then dispersed therein, while being pulverized into a predetermined average particle diameter by using a ball milling process, or the like.

The method for applying a composition for forming a porous coating layer onto the porous polymer substrate may include a slot coating process or dip coating process, but is not limited thereto. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing slurry to carry out coating and is capable of controlling the thickness of a coating layer depending on the concentration of the composition and the rate of removing the substrate from the slurry tank. Further, in order to control the coating thickness more precisely, it is possible to carry out post-metering through a Mayer bar or the like, after dipping.

Then, the porous polymer substrate coated with a composition for forming a porous coating layer as mentioned above is dried by using a dryer, such as an oven, to form a porous coating layer on at least one surface of the porous polymer substrate.

According to an embodiment of the present disclosure, the binder polymer in the porous coating layer attaches the inorganic particles to each other so that they may retain their binding states (in other words, the binder polymer connects and fixes the inorganic particles with one another). The inorganic particles in the porous coating layer may form interstitial volumes while they are substantially in contact with one another, wherein the interstitial volumes mean a space defined by the inorganic particles facing each other substantially in a closely packed or densely packed structure of the inorganic particles. The interstitial volumes among the inorganic particles may become vacant spaces to form pores of the porous coating layer.

Then, a porous adhesive layer, containing an adhesive resin which realizes adhesive property through heating at a temperature lower than the melting point of the porous polymer substrate, is formed on at least one surface of the separator base.

Particularly, the step of forming the porous adhesive layer may include the steps of: applying a coating composition containing the adhesive resin, a solvent and a non-solvent onto at least one surface of the separator base; and drying the coating composition to form a porous adhesive layer having a porous structure by phase separation caused by a difference between the evaporation rate of the solvent and that of the non-solvent. As described above, the adhesive resin is polyvinylidene fluoride-co-hexafluoropropylene containing vinylidene fluoride-derived repeating units and hexafluoropropylene-derived repeating units, wherein the ratio of the number of the hexafluoropropylene (HFP)-derived repeating units (HFP substitution ratio) based on the total number of the vinylidene fluoride-derived repeating units and the hexafluoropropylene-derived repeating units is 4.5-9%.

The method for applying the coating composition onto at least one surface of the separator base preferably includes a slot coating process or dip coating process, but is not limited thereto.

Herein, the solvent preferably has a solubility parameter similar to the solubility of the adhesive resin to be used and a low boiling point. This is because such a solvent facilitates homogeneous mixing and the subsequent solvent removal. Non-limiting examples of the solvent that may be used include any one selected from acetone, tetrahydrofuran, methylene chloride, chloroform, dimethyl formamide, N-methyl-2-pyrrolidone, methyl ethyl ketone and cyclohexane, or a mixture of two or more of them.

In addition, non-limiting examples of the non-solvent may include any one selected from methanol, ethanol, isopropanol, propanol and water, or a mixture of two or more of them. The non-solvent may be selected suitably depending on the type of adhesive resin to be used.

The coating composition may include the non-solvent at a weight ratio of 1-50 wt %, particularly 2-30 wt %, and more particularly 3-15 wt %, based on the total weight of the solvent and the non-solvent. When the weight ratio of the non-solvent satisfies the above-defined range, it is possible to prevent a problem caused by gelling during the preparation of the coating composition, while providing the effect of the non-solvent, and to form an adhesive layer having a porous structure.

The coating composition may include polyvinylidene fluoride-co-hexafluoropropylene in an amount of 2-10 parts by weight, particularly 3-10 parts by weight, and more particularly 4-10 parts by weight, based on 100 parts by weight of the total weight of the solvent and the non-solvent. When the content of polyvinylidene fluoride-co-hexafluoropropylene satisfies the above-defined range, it is possible to prevent degradation of coating layer density caused by a decrease in solid content, and to prevent gelling of copolymer caused by the reaction between the copolymer and the non-solvent.

The porous adhesive layer may have a thickness of 0.1-8 μm, particularly 0.5-4 μm.

According to an embodiment of the present disclosure, the solvent and the non-solvent in the coating composition may show a difference in boiling point of 10° C. or more, particularly 10-100° C., and more particularly 10-50° C. When the difference in boiling point between the solvent and the non-solvent satisfies the above-defined range, it is possible to control formation of pores resulting from the difference in evaporation rate between the solvent and the non-solvent, and to ensure miscibility of the solvent with the non-solvent.

The coating composition containing the adhesive resin, solvent and the non-solvent forms a single phase. However, while the coating composition is applied to at least one surface of the separator base and then dried, it becomes a thermodynamically unstable state and converted into a two-phase solution.

In other words, upon drying, the solvent having a lower boiling point evaporates first so that the concentration of the non-solvent is relatively increased in the coated composition. As a result, phase separation is accelerated between the non-solvent and adhesive resin immiscible with each other so that an adhesive resin-enriched phase and an adhesive resin-poor phase may be separated from each other.

As the solvent evaporates, the concentration of the adhesive resin is increased to cause a decrease in solvation property of the adhesive resin, and the adhesive resin-enriched phase is solidified to form a solid matrix with which the adhesive resin-poor phase surrounded. Herein, while the non-solvent surrounded with the solid matrix phase is removed finally through evaporation, the spaces occupied by the non-solvent become pores, thereby providing a porous adhesive layer having morphology with a porous structure. Herein, the binder is distributed in such a manner that it may have a polymer-poor structure from the surface layer toward the interfacial layer, which contributes to reduction of the resistance of the coated separator.

The drying temperature may be 100° C. or less, particularly 25-50° C., and more particularly 25-40° C.

In another aspect, there is provided an electrochemical device including a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors such as super capacitor devices. Particularly, among the secondary batteries, lithium secondary batteries, including lithium metal secondary batteries, lithium ion secondary batteries, lithium polymer secondary batteries or lithium ion polymer ion batteries, are preferred.

The cathode and anode used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite, artificial graphite, natural graphite or other carbonaceous materials are used preferably. Non-limiting examples of a cathode current collector include foil made of aluminum, nickel or a combination thereof. Non-limiting examples of an anode current collector include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate(DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (g-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, 10 parts by weight of a mixture of polybutyl acrylate with polybutyl methacrylate (weight ratio 7:3) as a binder polymer and 10 parts by weight of carboxymethyl cellulose (CMC) as a binder polymer and dispersion agent were added to water and agitated at room temperature for about 12 hours or more to prepare a binder solution. Next, 380 parts by weight of alumina ($Al_2O_3$) particles having an average particle diameter of 500 nm were added to the resultant binder polymer solution and dispersed therein to prepare slurry for a porous coating layer. Herein, the inorganic particles (alumina) and the binder polymer (polybutyl acrylate, polybutyl methacrylate and carboxymethyl cellulose) were used at a weight ratio of 95:5 in the slurry for a porous coating layer.

The resultant slurry was coated onto one surface of a polyethylene porous membrane (air permeability 160 cc/100 mL, resistance 0.66 ohm, air permeability 142 sec/100 cc) having a thickness of 14 μm through a slot coating process, and the coating thickness was controlled to about 2 μm to obtain a separator base including a porous coating layer on one surface thereof.

In the porous coating layer, the binder polymer was present in an amount of 5 wt % based on the total weight of the porous coating layer.

Then, acetone (boiling point: 56.05° C.) as a solvent and isopropanol (boiling point: 82.6° C.) as a non-solvent were mixed at a weight ratio of 95:5, and then polyvinylidene fluoride-co-hexafluoropropylene (PVdF-HFP, HFP substitution ratio: 5%) as an adhesive resin was added to the resultant mixture in an amount of 4 parts by weight based on 100 parts by weight of the total weight of acetone and isopropanol. The adhesive resin was dissolved in the mixture at 50° C. for about 12 hours to prepare a composition for coating a porous adhesive layer. Herein, the HFP substitution ratio means the ratio of the number of the hexafluoropropylene (HFP)-derived repeating units based on the total number of the vinylidene fluoride-derived repeating units and the hexafluoropropylene-derived repeating units.

The prepared composition for coating a porous adhesive layer was applied (coating amount: 3.3 g/m$^2$) onto the separator base prepared as described above through a dip coating process, and dried at 100° C. or less while maintaining a humidity of 30% or less to carry out a dry phase separation process. In this manner, a separator including a porous adhesive layer formed on both surfaces of the separator base was obtained.

The obtained separator has a double-side asymmetric structure in which the porous adhesive layer/porous polymer substrate/porous coating layer/porous adhesive layer are stacked successively.

In addition, the porous coating layer and the porous adhesive layer in the resultant separator had a thickness of about 2 µm and 1 µm, respectively.

Example 2

A separator was obtained in the same manner as Example 1, except that acetone as a solvent and isopropanol as a non-solvent were mixed at a weight ratio of 95:5, and then polyvinylidene fluoride-co-hexafluoropropylene (PVdF-HFP, HFP substitution ratio: 8%) as an adhesive resin was added to the resultant mixture in an amount of 4 parts by weight based on 100 parts by weight of the total weight of acetone and isopropanol, when preparing a composition for coating a porous adhesive layer.

The obtained separator has a double-side asymmetric structure in which the porous adhesive layer/porous polymer substrate/porous coating layer/porous adhesive layer are stacked successively.

In addition, the porous coating layer and the porous adhesive layer in the resultant separator had a thickness of about 2 µm and 1 µm, respectively.

Comparative Example 1

A separator was obtained in the same manner as Example 1, except that acetone as a solvent and isopropanol as a non-solvent were mixed at a weight ratio of 95:5, and then polyvinylidene fluoride-co-hexafluoropropylene (PVdF-HFP, HFP substitution ratio: 10%) as an adhesive resin was added to the resultant mixture in an amount of 4 parts by weight based on 100 parts by weight of the total weight of acetone and isopropanol, when preparing a composition for coating a porous adhesive layer.

The obtained separator has a double-side asymmetric structure in which the porous adhesive layer/porous polymer substrate/porous coating layer/porous adhesive layer are stacked successively.

In addition, the porous coating layer and the porous adhesive layer in the resultant separator had a thickness of about 2 µm and 1 µm, respectively.

Comparative Example 2

A separator was obtained in the same manner as Example 1, except that acetone as a solvent and isopropanol as a non-solvent were mixed at a weight ratio of 95:5, and then polyvinylidene fluoride-co-hexafluoropropylene (PVdF-HFP, HFP substitution ratio: 15%) as an adhesive resin was added to the resultant mixture in an amount of 4 parts by weight based on 100 parts by weight of the total weight of acetone and isopropanol, when preparing a composition for coating a porous adhesive layer.

The obtained separator has a double-side asymmetric structure in which the porous adhesive layer/porous polymer substrate/porous coating layer/porous adhesive layer are stacked successively.

In addition, the porous coating layer and the porous adhesive layer in the resultant separator had a thickness of about 2 µm and 1 µm, respectively.

Comparative Example 3

A separator was obtained in the same manner as Example 1, except that acetone as a solvent and isopropanol as a non-solvent were mixed at a weight ratio of 95:5, and then polyvinylidene fluoride-co-hexafluoropropylene (PVdF-HFP, HFP substitution ratio: 4%) as an adhesive resin was added to the resultant mixture in an amount of 4 parts by weight based on 100 parts by weight of the total weight of acetone and isopropanol, when preparing a composition for coating a porous adhesive layer.

The obtained separator has a double-side asymmetric structure in which the porous adhesive layer/porous polymer substrate/porous coating layer/porous adhesive layer are stacked successively.

In addition, the porous coating layer and the porous adhesive layer in the resultant separator had a thickness of about 2 µm and 1 µm, respectively.

Evaluation Results

Each of the separators according to Examples 1 and 2 and Comparative Examples 1-3 was evaluated and calculated in terms of thickness, separator-separation adhesion (gf/25 mm), separator-anode adhesion (gf/25 mm), air permeability (sec/100 cc) and standard deviation thereof, resistance and standard deviation thereof, and the maximum pore size/average pore size of the porous adhesive layer and standard deviation thereof. The results are shown in the following Table 1.

The evaluation methods will be described in detail hereinafter.

(1) Evaluation of Separator-Separator Adhesion (gf/25 mm)

Each of the separators according to Examples 1 and 2 and Comparative Examples 1-3 was cut into a size of 25 mm×100 mm and two sheets of each separator were prepared.

The two sheets of separators were stacked, inserted between PET films having a thickness of 100 µm, and then the resultant structure was allowed to pass through a roll laminator at 100° C. to carry out adhesion. Herein, the roll laminator was operated at a rate of 0.3 m/min and heated for 30 seconds, wherein the pressure was 2 kgf/cm$^2$.

The end portion of the adhered laminate was mounted to a UTM apparatus (LLOYD Instrument, LF plus) and force was applied in both directions at a rate of 300 mm/min, and then the force required for separating the adhered separator from each other was measured.

(2) Evaluation of Separator-Anode Adhesion (gf/25 mm)

First, an active material (natural graphite and artificial graphite (weight ratio 5:5)), a conductive material (Super P®) and a binder polymer (polyvinylidene fluoride (PVdF)) were mixed at a weight ratio of 92:2:6. The resultant mixture was dispersed in water and coated on copper foil to obtain an anode. The anode was cut into a size of 25 mm×70 mm.

Each of the separators according to Examples 1 and 2 and Comparative Examples 1-3 was cut into a size of 25 mm×70 mm.

The prepared separator and anode were stacked, inserted between PET films having a thickness of 100 μm, and adhesion was carried out by using a flat press. Herein, the flat press was heated to 70° C. for 5 seconds under a pressure of 200 MPa.

The end portion of the adhered separator and anode was mounted to a UTM apparatus (LLOYD Instrument, LF plus) and force was applied in both directions at a rate of 300 mm/min, and then the force required for separating the adhered separator from the anode was measured.

(3) Evaluation of Air Permeability (sec/100 cc)

Air permeability (Gurley) was determined based on ASTM D726-94. Herein, Gurley value is resistance against air flow and is determined by using Gurley densometer. As used herein, air permeability is expressed in terms of air permeation time, i.e. time (second) required for 100 cc of air to pass through 1 in² of the section of each of the separators according to Examples 1 and 2 and Comparative Examples 1-3 under a pressure of 12.2 MPa in $H_2O$.

(4) Resistance

Resistance means a resistance value when each of the separators according to Examples 1 and 2 and Comparative Examples 1-3 is impregnated with an electrolyte. Resistance was measured through an alternating current method at 25° C. by using an electrolyte containing 1M $LiPF_6$ in ethylene carbonate/ethyl methyl carbonate (weight ratio 3:7).

(5) Maximum Pore Size/Average Pore Size of Porous Adhesive Layer

Field emission-scanning electron microscopy (FE-SEM) (Hitachi S-4800 Scanning electron Microscope) was used to analyze the surface of a sample with a magnification of 2,500×. In the SEM image, the longer axis length of the surface pores identified in an optionally sampled region (width 10 μm or more, length 15 μm or more) was taken as 'pore size'. At least 10 pores were analyzed and the average value and maximum value of pore sizes were calculated.

TABLE 1

| | Ex. 1 | Com. Ex. 1 | Comp. Ex. 2 | Ex. 2 | Comp. Ex. 3 |
|---|---|---|---|---|---|
| Total separator thickness (μm) | 17.0 | 17.7 | 18.2 | 17.6 | 17.8 |
| Porous coating layer thickness (μm) | 2 | 2 | 2 | 2 | 2 |
| Porous substrate thickness (μm) | 11.9 | 11.9 | 11.9 | 11.9 | 11.9 |
| Porous adhesive layer porosity (%) | 50.3 | 55.5 | 49.7 | 39.2 | 41.3 |
| Separator-separator adhesion (gf/25 mm) | 10.5 | 7.2 | 11.8 | 12.5 | 10.3 |
| Separator-anode adhesion (gf/25 mm) | 14.1 | 8.5 | 6.4 | 17.5 | 14.2 |
| Air permeability (sec/100 cc) | 276 | 339 | 350 | 321 | 264 |
| Standard deviation of air permeability | 3.9 | 9.5 | 13.2 | 4.2 | 8.3 |
| Resistance (Ω) | 1.04 | 1.14 | 1.26 | 1.13 | 1.00 |
| Standard deviation of resistance | 0.03 | 0.07 | 0.10 | 0.04 | 0.08 |
| Average pore size of porous adhesive layer (μm) | 1.51 | 1.58 | 1.86 | 1.60 | 1.23 |
| Maximum pore size of porous adhesive layer (μm) | 1.94 | 2.55 | 3.19 | 2.19 | 2.12 |
| Standard deviation of pore size of porous adhesive layer | 0.29 | 0.46 | 0.58 | 0.22 | 0.51 |

Referring to Table 1, the separators according to Examples 1 and 2 show significantly smaller standard deviation values of air permeability, resistance and porous adhesive layer pore size, as compared to Comparative Examples 1-3. As a result, in the case of the separators according to Examples 1 and 2, it is possible to prevent the problem of dendrite formation caused by interruption (e.g. delayed rate at a specific portion) during the transport of lithium ions through the separators. It is also possible for the secondary batteries using the separators according to Examples 1 and 2 to realize excellent life characteristics. On the contrary, in the case of the separators according to Comparative Examples 1-3, air permeability, resistance and porous adhesive layer pore size are not uniform. Thus, it is expected that the secondary batteries using the separators Comparative Examples 1-3 show degradation of life characteristics.

Observation of Surface Morphology

Figure 1:
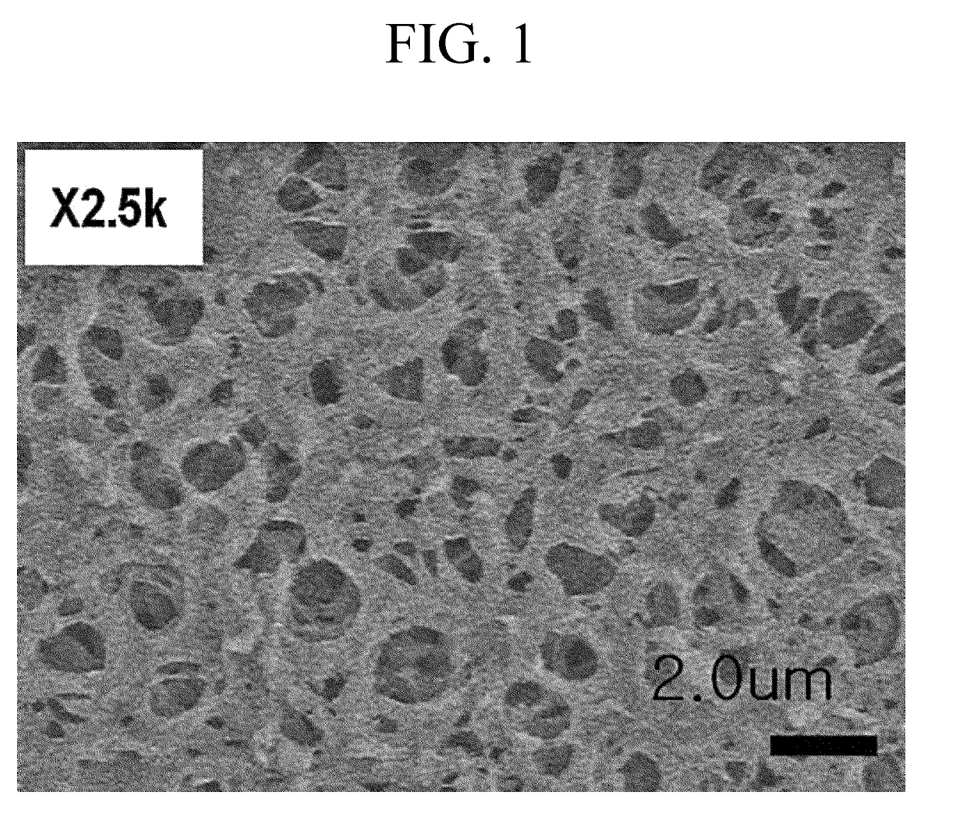
FIG. 1 is a field emission-scanning electron microscopic (FE-SEM) image illustrating the morphology of the surface of the separator according to Example 1.
Figure 2:
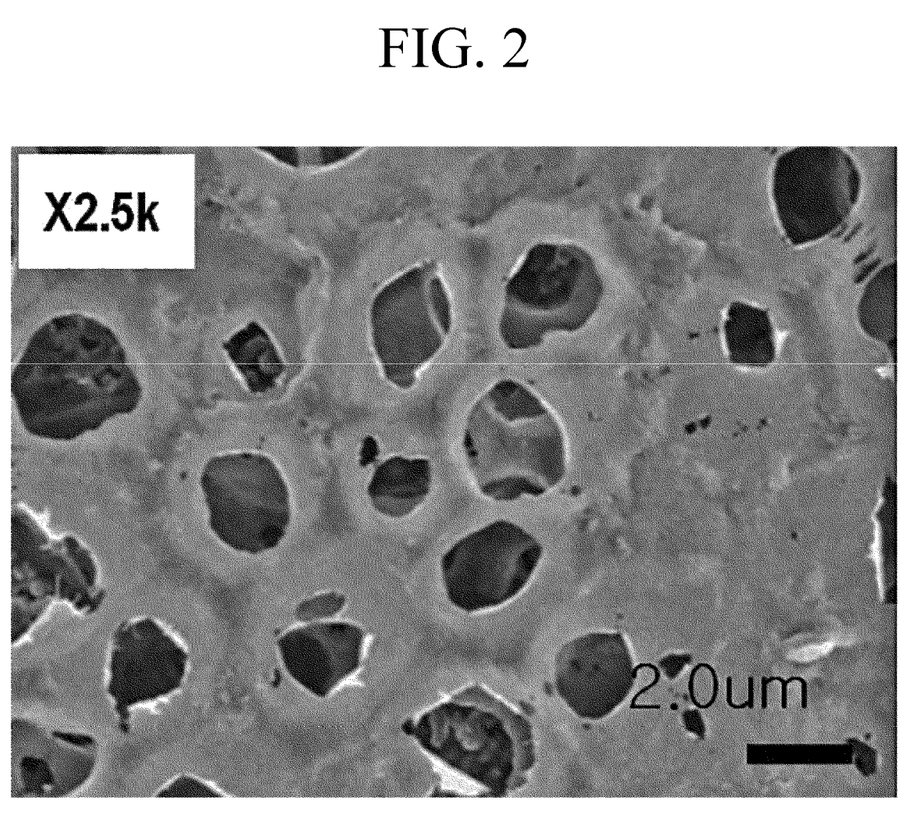
FIG. 2 is an FE-SEM image illustrating the morphology of the surface of the separator according to Example 2.
Figure 3:
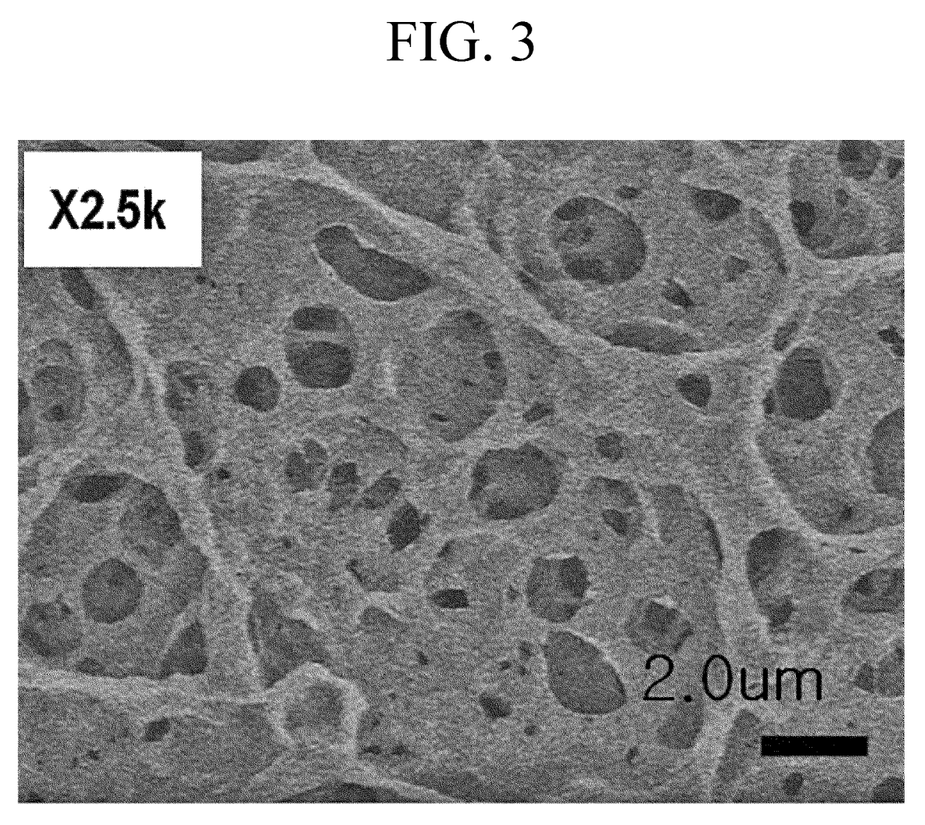
FIG. 3 is an FE-SEM image illustrating the morphology of the surface of the separator according to Comparative Example 1.
Figure 4:
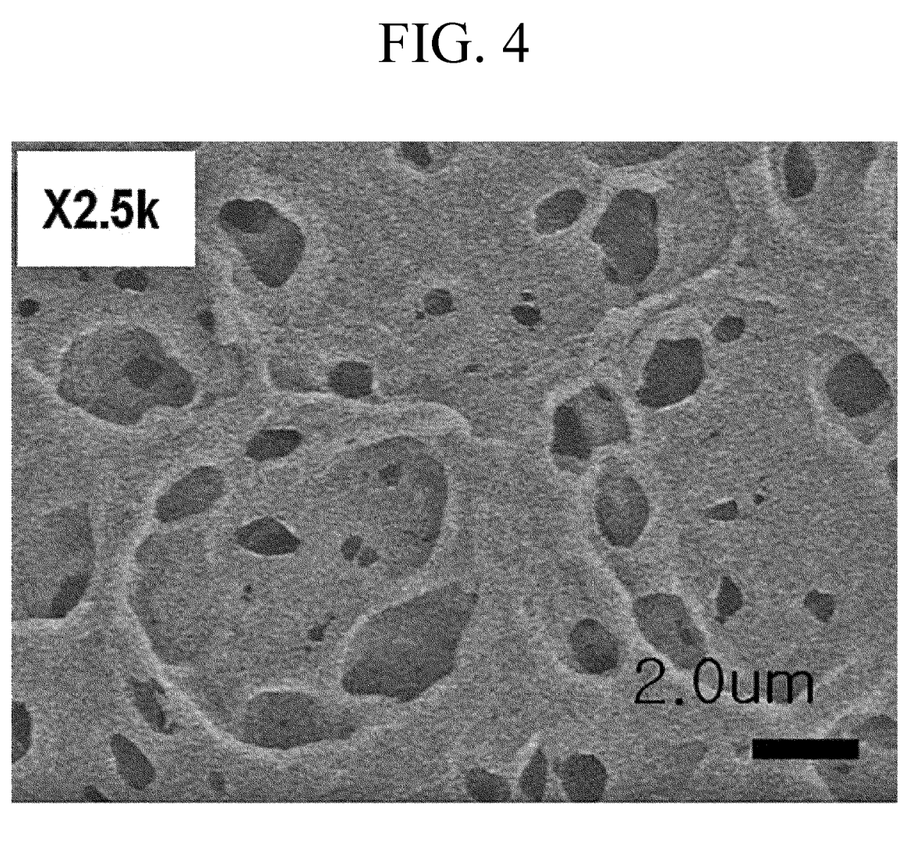
FIG. 4 is an FE-SEM image illustrating the morphology of the surface of the separator according to Comparative Example 2.
Figure 5:
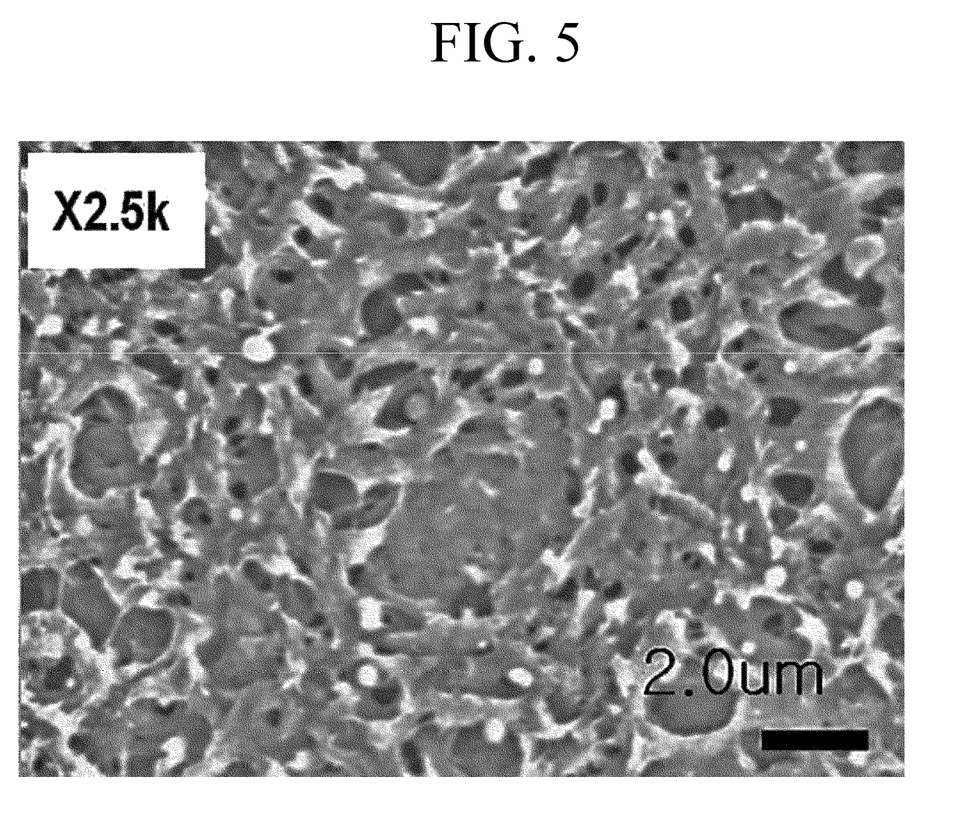
FIG. 5 is an FE-SEM image illustrating the morphology of the surface of the separator according to Comparative Example 3.

The surface morphology of each of the separators according to Examples 1 and 2 and Comparative Examples 1-3 was observed by using field emission-scanning electron microscopy (FE-SEM) (Hitachi S-4800 Scanning electron Microscope) under an accelerated voltage of 5 kV. The results are shown in FIGS. 1-5.

Referring to FIGS. 1-5, it can be seen that the porous structure of the porous adhesive layer on the surface of each of the separators according to Examples 1 and 2 has uniform size distribution, while the porous structure of the porous adhesive layer on the surface of each of the separators according to Comparative Examples 1-3 shows a significantly large standard deviation and non-uniform distribution. Such porous structural uniformity in Examples 1 and 2 results in uniform air permeability and resistance values, as determined from Table 1. As a result, the secondary batteries using such separators can provide significantly improve life characteristics.

What is claimed is:

1. A separator comprising:
   a separator base comprising a porous polymer substrate having a plurality of pores, and a porous coating layer on at least one surface of the porous polymer substrate,
   wherein the porous coating layer comprises a plurality of inorganic particles and a binder polymer positioned on a whole or a part of a surface of the inorganic particles to connect and fix the inorganic particles with one another,
   wherein the binder polymer is at least one selected from the group consisting of polyvinylidene fluoride-co-hexafluoropropylene, polyvinylidene fluoride-co-trichloroethylene, polymethyl methacrylate, polybutyl acrylate, polybutyl methacrylate, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethyl cellulose, cyanoethyl sucrose, pullulan and carboxymethyl cellulose; and a porous adhesive layer on at least one surface of the porous coating layer, wherein the porous adhesive layer comprises polyvinylidene fluoride-co-hexafluoropropylene comprising vinylidene fluoride-derived repeating units and hexafluoropropylene-derived repeating units, wherein a ratio of the number of the hexafluoropropylene (HFP)-derived repeating units (HFP substitution ratio) based on a total number of the vinylidene fluoride-derived repeating units and the hexafluoropropylene-derived repeating units is 4.5% to 9%, wherein the porous adhesive layer has a porosity of 30% to 70%, wherein the porous adhesive layer has a porous structure formed by phase separation caused by a difference between an evaporation rate of a solvent and a non-solvent when applying a coating composition comprising polyvinylidene fluoride-co-hexafluoropropylene, the solvent and the non-solvent onto the at least one surface of the porous coating layer, followed by drying the porous adhesive layer, and wherein the porous adhesive layer comprises pores, wherein a difference between a maximum pore diameter and average pore diameter ranges from 0.2 μm to 0.4 μm.

2. The separator according to claim 1, wherein the ratio of the number of the hexafluoropropylene (HFP)-derived repeating units (HFP substitution ratio) based on the total number of the vinylidene fluoride-derived repeating units and the hexafluoropropylene-derived repeating units is 5% to 8%.

3. The separator according to claim 1, wherein the porous polymer substrate is a polyolefin-based porous polymer substrate.

4. The separator according to claim 1, wherein the inorganic particles are at least one selected from the group consisting of inorganic particles having a dielectric constant of 5 or more, and inorganic particles having lithium ion transportability.

5. An electrochemical device comprising:
a cathode,
an anode and
a separator interposed between the cathode and the anode, wherein the separator is the separator as defined in claim 1.

6. The electrochemical device according to claim 5, which is a lithium secondary battery.

7. A method for manufacturing a separator, comprising:
preparing a separator base comprising a porous polymer substrate having a plurality of pores, and a porous coating layer positioned on at least one surface of the porous polymer substrate and containing a plurality of inorganic particles and a binder polymer positioned on the whole or a part of the surface of the inorganic particles to connect and fix the inorganic particles with one another, wherein the binder polymer is at least one selected from the group consisting of polyvinylidene fluoride-co-hexafluoropropylene, polyvinylidene fluoride-co-trichloroethylene, polymethyl methacrylate, polybutyl acrylate, polybutyl methacrylate, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethyl cellulose, cyanoethyl sucrose, pullulan and carboxymethyl cellulose;

applying a coating composition comprising polyvinylidene fluoride-co-hexafluoropropylene comprising vinylidene fluoride-derived repeating units and hexafluoropropylene-derived repeating units, a solvent and a non-solvent onto at least one surface of the porous coating layer; and drying the coating composition to form a porous adhesive layer having a porous structure formed by phase separation caused by a difference between an evaporation rate of the solvent and the non-solvent, wherein the porous adhesive layer has a porosity of 30% to 70%, wherein a ratio of the number of the hexafluoropropylene-derived repeating units based on a total number of the vinylidene fluoride-derived repeating units and the hexafluoropropylene-derived repeating units is 4.5% to 9%, and wherein the porous adhesive layer comprises pores, wherein a difference between a maximum pore diameter and average pore diameter ranges from 0.2 μm to 0.4 μm.

8. The method for manufacturing the separator according to claim 7, wherein the ratio of the number of the hexafluoropropylene (HFP)-derived repeating units (HFP substitution ratio) based on the total number of the vinylidene fluoride-derived repeating units and the hexafluoropropylene-derived repeating units is 5% to 8%.

9. The method for manufacturing the separator according to claim 7,
wherein the solvent is at least one compound selected from the group consisting of acetone, tetrahydrofuran, methylene chloride, chloroform, dimethyl formamide, N-methyl-2-pyrrolidone, methyl ethyl ketone and cyclohexane, and wherein the non-solvent is at least one compound selected from the group consisting of methanol, ethanol, isopropanol, propanol and water.

10. The method for manufacturing the separator according to claim 7, wherein the coating composition comprises the non-solvent at a weight ratio of 1% to 50% based on a total weight of the solvent and the non-solvent.

11. The method for manufacturing the separator according to claim 7, wherein the coating composition comprises polyvinylidene fluoride-co-hexafluoropropylene in an amount of 2 parts to 10 parts by weight based on 100 parts by weight of a total weight of the solvent and the non-solvent.

12. The method for manufacturing the separator according to claim 7, wherein the solvent and the non-solvent in the coating composition have a difference in boiling point of 10° C. or more.

* * * * *